United States Patent
Sundaram et al.

(10) Patent No.: US 9,734,822 B1
(45) Date of Patent: Aug. 15, 2017

(54) FEEDBACK BASED BEAMFORMED SIGNAL SELECTION

(71) Applicant: Amazon Technologies, Inc., Seattle, WA (US)

(72) Inventors: Shiva Sundaram, Mountain View, CA (US); Ramya Gopalan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/727,504

(22) Filed: Jun. 1, 2015

(51) Int. Cl.
| | |
|---|---|
| *G10L 17/22* | (2013.01) |
| *H04R 1/08* | (2006.01) |
| *G10L 15/08* | (2006.01) |
| *G10L 15/02* | (2006.01) |
| *G10L 21/00* | (2013.01) |
| *G10L 15/04* | (2013.01) |

(52) U.S. Cl.
CPC .............. *G10L 15/08* (2013.01); *G10L 17/22* (2013.01); *H04R 1/08* (2013.01); *H04R 2430/00* (2013.01)

(58) Field of Classification Search
CPC ......... G10L 17/22; G10L 21/00; G10L 15/04; G10L 15/08; G10L 15/02; G10K 11/16; H04R 1/08
USPC ............... 704/231, 275, 249, 226, 233, 251; 381/66, 92
See application file for complete search history.

(56) References Cited

U.S. PATENT DOCUMENTS

| | | | | |
|---|---|---|---|---|
| 7,885,818 | B2 * | 2/2011 | Vignoli | G10L 15/26 704/246 |
| 9,076,450 | B1 * | 7/2015 | Sadek | G10L 15/34 |
| 2012/0330653 | A1 * | 12/2012 | Lissek | H04M 1/035 704/226 |
| 2013/0108066 | A1 | 5/2013 | Hyun et al. | |
| 2013/0148814 | A1 | 6/2013 | Karthik et al. | |
| 2014/0278394 | A1 * | 9/2014 | Bastyr | G10L 21/0208 704/233 |
| 2014/0286497 | A1 * | 9/2014 | Thyssen | H04R 3/005 381/66 |
| 2015/0006176 | A1 * | 1/2015 | Pogue | G10L 15/22 704/249 |
| 2015/0106085 | A1 * | 4/2015 | Lindahl | G10L 15/32 704/231 |

(Continued)

OTHER PUBLICATIONS

Sadjadi et al. "Robust Front-End Processing for Speaker Identification Over Extremely Degraded Communication Channels." Center for Robust Speech Systems (CRSS), The University of Texas at Dallas, Richardson, TX 75080-3021, USA. (May 2013). pp. 7214-7218.

*Primary Examiner* — Pierre-Louis Desir
*Assistant Examiner* — Seong Ah A Shin
(74) *Attorney, Agent, or Firm* — Knobbe Martens Olson & Bear LLP

(57) ABSTRACT

Features are disclosed for improving the accuracy and stability of beamformed signal selection. The selection may consider processing feedback information to identify when the current beam selection may need to be re-evaluated. The feedback information may further be used to select a beamformed signal for processing. For example, beams which detect wake-words or yield high confidence speech recognition may be favored over beams which fail to detect or recognize at a lower confidence level.

17 Claims, 8 Drawing Sheets

(56) References Cited

U.S. PATENT DOCUMENTS

2015/0279352 A1* 10/2015 Willett .................... G10L 15/30
　　　　　　　　　　　　　　　　　　　　704/231
2017/0076720 A1* 3/2017 Gopalan ................. G06F 3/167

* cited by examiner

FEEDBACK BASED BEAMFORMED SIGNAL SELECTION

BACKGROUND

Beamforming, which is sometimes referred to as spatial filtering, is a signal processing technique used in sensor arrays for directional signal transmission or reception. For example, beamforming is a common task in array signal processing, including diverse fields such as for acoustics, communications, sonar, radar, astronomy, seismology, and medical imaging. A plurality of spatially-separated sensors, collectively referred to as a sensor array, can be employed for sampling wave fields. Signal processing of the sensor data allows for spatial filtering, which facilitates a better extraction of a desired source signal in a particular direction and suppression of unwanted interference signals from other directions. For example, sensor data can be combined in such a way that signals arriving from particular angles experience constructive interference while others experience destructive interference. The improvement of the sensor array compared with reception from an omnidirectional sensor is known as the gain (or loss). The pattern of constructive and destructive interference may be referred to as a weighting pattern, or beampattern.

As one example, microphone arrays are known in the field of acoustics. A microphone array has advantages over a conventional unidirectional microphone. By processing the outputs of several microphones in an array with a beamforming process, a microphone array enables picking up acoustic signals dependent on their direction of propagation. In particular, sound arriving from a small range of directions can be emphasized while sound coming from other directions is attenuated. For this reason, beamforming with microphone arrays is also referred to as spatial filtering. Such a capability enables the recovery of speech in noisy environments and is useful in areas such as telephony, teleconferencing, video conferencing, and hearing aids.

Signal processing of the sensor data of a beamformer may involve processing the signal of each sensor with a filter weight and adding the filtered sensor data. This is known as a filter-and-sum beamformer. Such filtering may be implemented in the time domain. The filtering of sensor data can also be implemented in the frequency domain by multiplying the sensor data with known weights for each frequency, and computing the sum of the weighted sensor data.

Altering the filter weights applied to the sensor data can be used to alter the spatial filtering properties of the beamformer. For example, filter weights for a beamformer can be chosen based on a desired look direction, which is a direction for which a waveform detected by the sensor array from a direction other than the look direction is suppressed relative to a waveform detected by the sensor array from the look direction.

The desired look direction may not necessarily be known. For example, a microphone array may be used to acquire an audio input signal comprising speech of a user. In this example, the desired look direction may be in the direction of the user. Selecting a beam signal with a look direction in the direction of the user likely would have a stronger speech signal than a beam signal with a look direction in any other direction, thereby facilitating better speech recognition. However, the direction of the user may not be known. Furthermore, even if the direction of the user is known at a given time, the direction of the user may quickly change as the user moves in relation to the sensor array, as the sensor array moves in relation to the user, or as the room and environment acoustics change.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Embodiments of systems, devices, and methods suitable for performing feedback based beamformed signal selection are described herein. The features described enhance beam selection (BSD) accuracy and stability by considering feedback information such as from a wake-word (WW) engine and/or speech recognition (ASR) engine.

A beam selection algorithm generally selects the beam that is closest to direct path between the user and device. Examples of beam selection are described in U.S. patent application Ser. No. 14/447,498 filed on Jul. 30, 2014 and herein incorporated by reference in its entirety. The process of beam selection may be hindered by incorrect or spurious beam selection in acoustically challenging environments and device locations. For example, when the sensor is located close to wall corners, highly reflective surfaces, or locations where the device microphones are occluded, the beam selection may incorrectly identify the beam that is closest to the direct path between the user and the device (e.g., "correct" beam). Another challenge to proper beam selection is performing beam switching mid-utterance. For example, although the beam selection identified the "correct" beam at the beginning of an utterance, the selection may switch beams based on receipt of an extraneous, sudden noise event. This can cause the reminder of the utterance being captured from a direction that is away from the direct path.

To address these and other beam selection challenges, features are described which allow beam selection algorithm to obtain feedback such as WW detection information or speech recognition information from a WW engine or an ASR engine. A wake-word engine may be configured to detect particular words or phrases in audio data (e.g., "wake" words or other keywords or phrases spoken to initiate interaction with the computing device). The phrase wake-word engine is generally used to describe a component configured to identify potential key words in received audio signal which will trigger (e.g., wake) a system. The wake-word engine may receive one or more of the beamformed audio signal to determine whether a portion of the beamformed audio signal is likely to contain information corresponding to a word or phrase to be detected. Once a potential wake-word is detected, an automatic speech recognition engine may receive the beamformed audio signal to determine which words or phrases are present. The automatic speech recognition engine may then provide a transcript or other output predicting the words identified by the beamformed audio signal. In some implementations, the ASR engine output may be provided to the wake-word engine to assist in the detection of a wake-word.

Various aspects of the disclosure will now be described with regard to certain examples and embodiments, which are intended to illustrate but not to limit the disclosure.

Figure 1A:
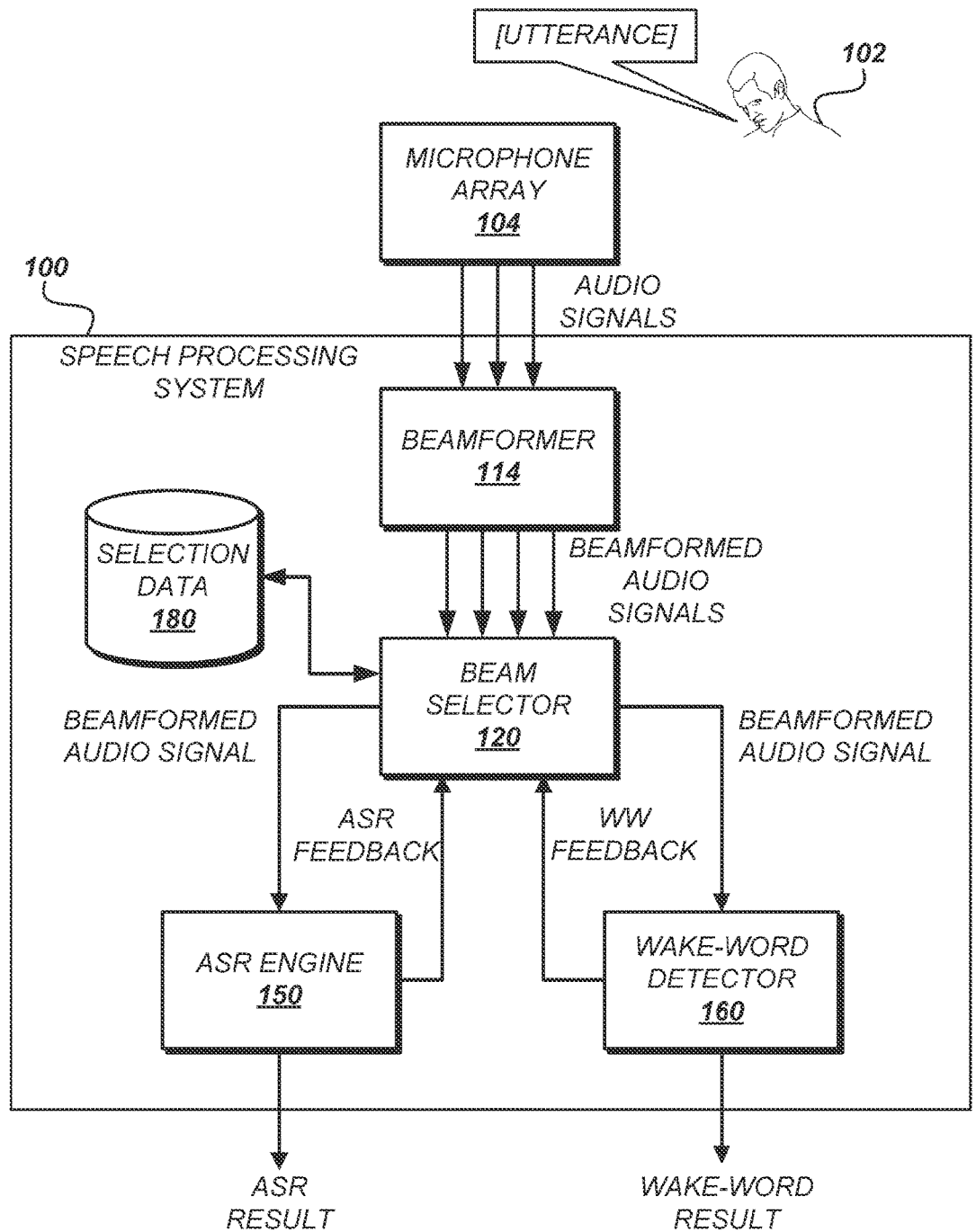
FIG. 1A shows a functional block diagram of an example speech processing system configured for feedback based beamformed signal selection.

FIG. 1A shows a functional block diagram of an example speech processing system configured for feedback based beamformed signal selection. The speech processing system 100 shown in FIG. 1A may implement aspects of the present disclosure. In particular, FIG. 1A shows example data flows between various speech and language processing modules in response to receipt of user utterances. A user 120 may make an utterance, such as an utterance that includes a spoken command for a computing system to perform some task. In one specific non-limiting example, the user 120 may say "Play Rocket Man by William Shatner." The word "play" may be a wake word which causes the system 100 to enable a function to play the requested song. The user 120 may speak the utterance into (or in the presence of) a client device configured to capture audio via a microphone array 104.

The client device can correspond to a wide variety of electronic devices. In some embodiments, the client device may be a computing device that includes one or more processors and a memory which may contain software applications executed by the processors. The client device may include or be in communication with an audio input component for accepting speech input on which to perform speech recognition, such as the microphone array 104. The client device may also include or be in communication with an output device (not shown) for presenting responses or other information from the speech processing system 100, such as a speaker or a display. The software of the client device may include at least one of hardware components or software for establishing communications over wireless communication networks or directly with other computing devices. Illustratively, the client device may be a mobile device, such as a mobile phone, personal digital assistant ("PDA"), mobile gaming device, media player, electronic book reader, tablet computer, laptop computer, or the like. In some embodiments, the client device may be a substantially stationary device, such as a television with program execution capabilities and network connectivity (a "smart TV"), set-top box, gaming console, home entertainment system, desktop computer, server computer, or the like.

As shown in FIG. 1A, user utterances may be provided to the speech processing system 100. The speech processing system 100 can be a network-accessible system in communication with the microphone array 104 (or client device included therein) via a communication network, such as a cellular telephone network or the Internet. A user may use the client device to submit utterances, receive information, and initiate various processes, either on the client device or at the speech processing system 100. For example, the user can issue spoken commands to the client device in order to search for plane tickets as described above, set timers, listen to music, search, initiate phone calls, etc. In some implementations, the client device may include the speech processing system 100.

The microphone array 104 may include two or more sensors (e.g., transducers) configured to receive sound. The sensors within an array may be arranged in a geometric pattern such as a linear or circular geometric form. For example, for a given point, an array of four sensors may be placed in a circular pattern at 90 degree increments (e.g., 0, 90, 180, 270) to receive sound from four directions. In some implementations, the microphone array 104 may include a spatially disparate array of sensors in data communication. For example, a networked array of sensors may be included. The sensors included in the microphone array 104 may include one or more of omnidirectional microphones or shotgun microphones.

The speech processing system 100 shown in FIG. 1A includes a beamformer 114. The beamformer 114 is configured to receive audio signals from the microphone array 104 and provide one or more beamformed audio signals. The audio signals may be received via a receiver configured for communication with the client device. For example, when the receiver may include a network adapter configured to transmit and receive standardized network communications with the client device to receive the audio signals. In some implementations, the receiver may include a physical connection (e.g., wired) to the client device. The beamformer 114 and the process of beamforming are discussed in further detail with reference to FIGS. 2 through 4 below.

The beamformed audio signals shown in FIG. 1A are provided to a beam selector 120. The beam selector is configured to identify a beam which provides the audio that is closest to the source of the captured utterance (e.g., the user 102). The beam selector 120 may be configured to select one of the beamformed audio signals using the peak signal to noise ratio for each signal. The beamformed audio signal featuring the highest peak signal to noise ratio may provide the clearest audio signal for further speech processing. As noted above, selection based only on signal to noise ratio may result in inaccurate beam selection. Once a beamformed audio signal is selected, it may be provided to a speech processing element. In some implementations, it may be desirable to receive one or more audio signals at the beam selector 120 from the microphone array 104. For example, if a raw audio signal from a sensor included in the microphone array 104 provides the highest peak SNR, the raw signal may be preferred over a beamformed audio signal. In such implementations, the beamformer 114 may be configured to provide this sensor's audio signal without any filtering or adjustment. Audio signals that pass through the beamformer 114 and are output as a beamformed audio signal may not be different from the raw audio signal.

In some implementations, the beamformed audio signals are provided to the beam selector 120 via a buffer (not shown). The buffer may store beamformed audio signals from one or more previous points in time. The buffered signals may be used, for example, as a factor for selecting a current beam by comparing characteristics of the current beam with previous beam characteristics.

To facilitate a more robust beam selection, the beam selector 120 may be further configured to receive feedback from one or more speech processing elements. The speech processing system 100 may include an ASR engine 150 that performs automatic speech recognition on audio data regarding user utterances. The ASR engine 150 receives audio signal such as the beamformed audio signal and provides an ASR result. In some implementations, the ASR result is a transcript of the words represented by the audio signal. The ASR engine 150 may be further configured to provide ASR feedback. ASR feedback may be included in the ASR result. The ASR feedback may include information indicating whether the audio signal was accepted for automatic speech recognition, whether the words were recognized using the audio signal, confidence in the word or words recognized, and whether the ASR engine 150 caused a system response (e.g., played a song). The ASR feedback may be provided to the beam selector 120 as an additional input to the beam selection process.

The speech processing system 100 may include a wake-word detector 160 configured to receive audio signals and provide a wake-word result. The wake-word result indicates whether a wake-word was detected. The wake-word result may indicate a failure to detect the wake-word. The failure may be due to, for example, an error or because no wake-word was detected. In some implementations, the wake-word result may also include the potential wake word if one is detected. The wake-word detector 160 may, in some implementations, provide the wake-word result and/or the audio signal received by the wake-word detector 160 to the ASR engine 150 to obtain a transcript of the utterance captured in the audio signal. The wake-word feedback may include detection of a possible wake-word in the audio stream or identifying of a wake-word within the audio stream. The identification of a wake-word may be specified using a recognition confidence value. Because recognition is a prediction, the recognition confidence value indicates a degree of confidence in the recognition prediction. The wake-word feedback may be provided to the beam selector 120 as an additional input to the beam selection process.

Once the beam selector 120 identifies a beam, the selection may be stored in a selection data storage 180. In some implementations, the beam selector 120 may also store received feedback for the beams. For example, the selection data storage 180 may include a count for each beam indicating how often the beam results in correct wake-word detection. It should be appreciated that the beam selector 120 may provide a beamformed audio signal to one or both of the wake-word detector 160 and the ASR engine 150 for purposes of collecting selection data and not as the beam which will be used for subsequent triggering of the system 100. For example, an initial beam may be selected but a second-best beam may also be provided to the wake-word detector 160 to collect feedback for the second-best beam. Because conditions change, it may be useful to know, over a period of time, how the alternative beams would have performed (e.g., wake-word detection, ASR engine acceptance, ASR engine recognition, etc.).

As the process of beam selection may expend resources of the speech processing system 100, it may be desirable to control how often the beam selection process occurs. The beam selector 120 may obtain a selection threshold value. The selection threshold value may identify conditions which are to be satisfied before initiating selection of a beamformed audio signal. For example, if resources (e.g., power, available processor cycles) for the system 100 are low, it may be desirable to avoid beam selection until more resources are available. As another example, the relative improvement of selecting another beam may be small compared to the cost of performing the selection. In such instances, it may be desirable to compare the feedback information for the current beam with another beam to determine when re-evaluation of the beams should be performed. For example, a beam recognition confidence threshold may be provided whereby if the currently selected beam confidence as reported by the recognition feedback for the beam is below the beam recognition confidence threshold, the selection is to be performed. The threshold may be relative. For example, if the difference in confidence between the current beam and another beam exceeds a threshold, the need to select may be identified.

In some embodiments, the speech processing system 100 may include additional or fewer components than are shown in FIG. 1A. For example, a speech processing system may include a processing unit (not shown) and computer readable medium drive (not shown). The processing unit may be configured to coordinate the activities of the speech processing system 100 such as beam selection. In some embodiments, two or more computing devices may together form a computer system for executing features of the present disclosure. As another example, the beamformed audio signals may be provided to the speech processing system 100. In such implementations, another device may perform the beamforming such as the microphone array 104.

Figure 1B:
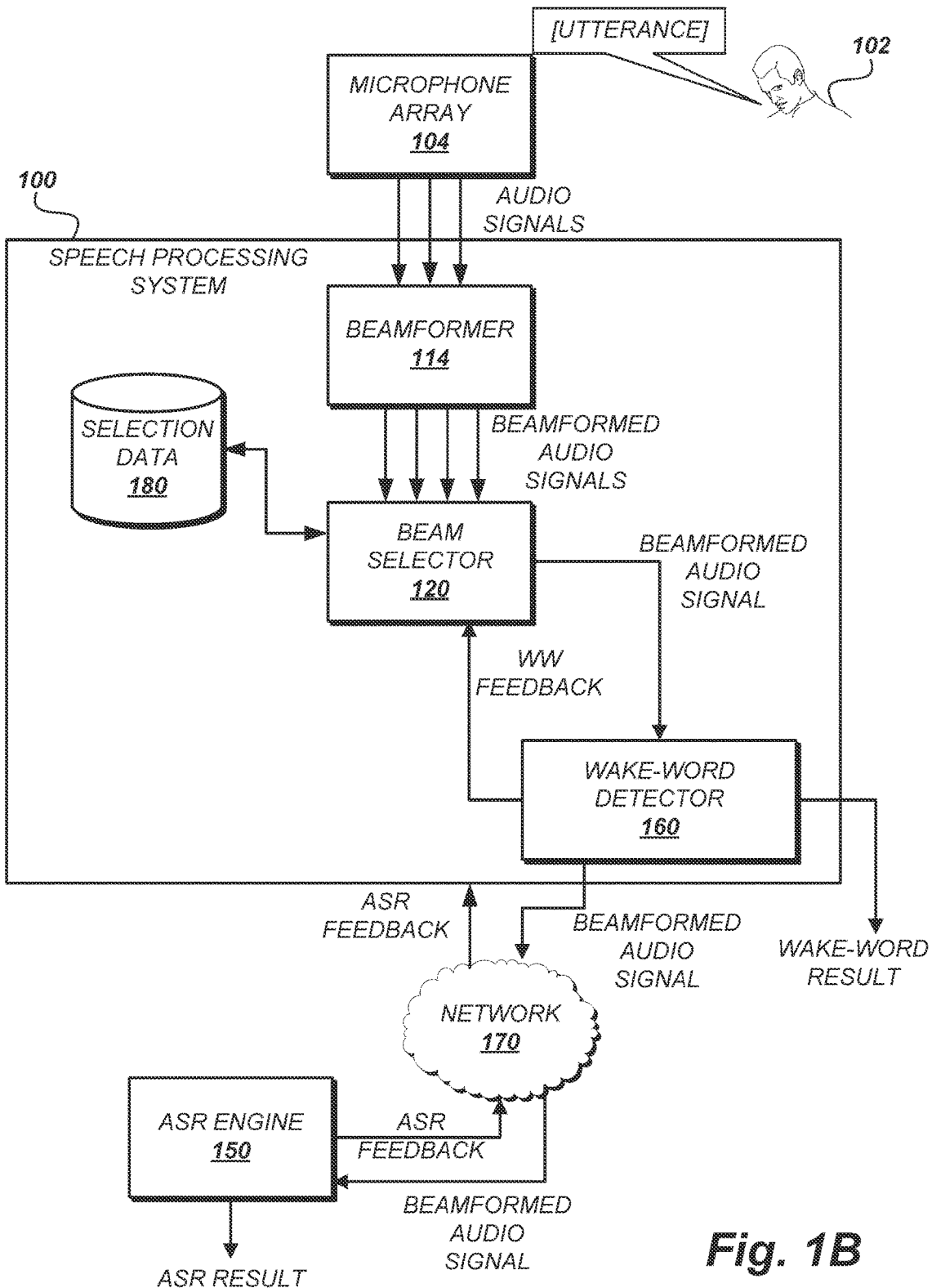
FIG. 1B shows a functional block diagram of another example speech processing system configured for feedback based beamformed signal selection.

FIG. 1B shows a functional block diagram of another example speech processing system configured for feedback based beamformed signal selection. The configuration shown in FIG. 1B highlights that a processing element such as the ASR engine 150, may be remotely coupled to the speech processing system 100. As shown in FIG. 1B, the wake-word detector 160 may transmit a beamformed audio signal via a network 170 to the ASR engine 150. This may be desirable when the speech processing system 100 faces operational resource constraints such as processor time, processor load, memory, power, and the like. In such implementations, the ASR engine 150 may provide the ASR feedback via the network 170 to the speech processing system 100. The ASR feedback may be provided to the beam selector 120 for consideration when performing further beam selection. The ASR feedback may include an identifier for the beamformed audio signal to which the feedback relates. The identifier may be included by the wake-word detector 160 when transmitting the beamformed audio signal to the ASR engine 150.

Figure 2:
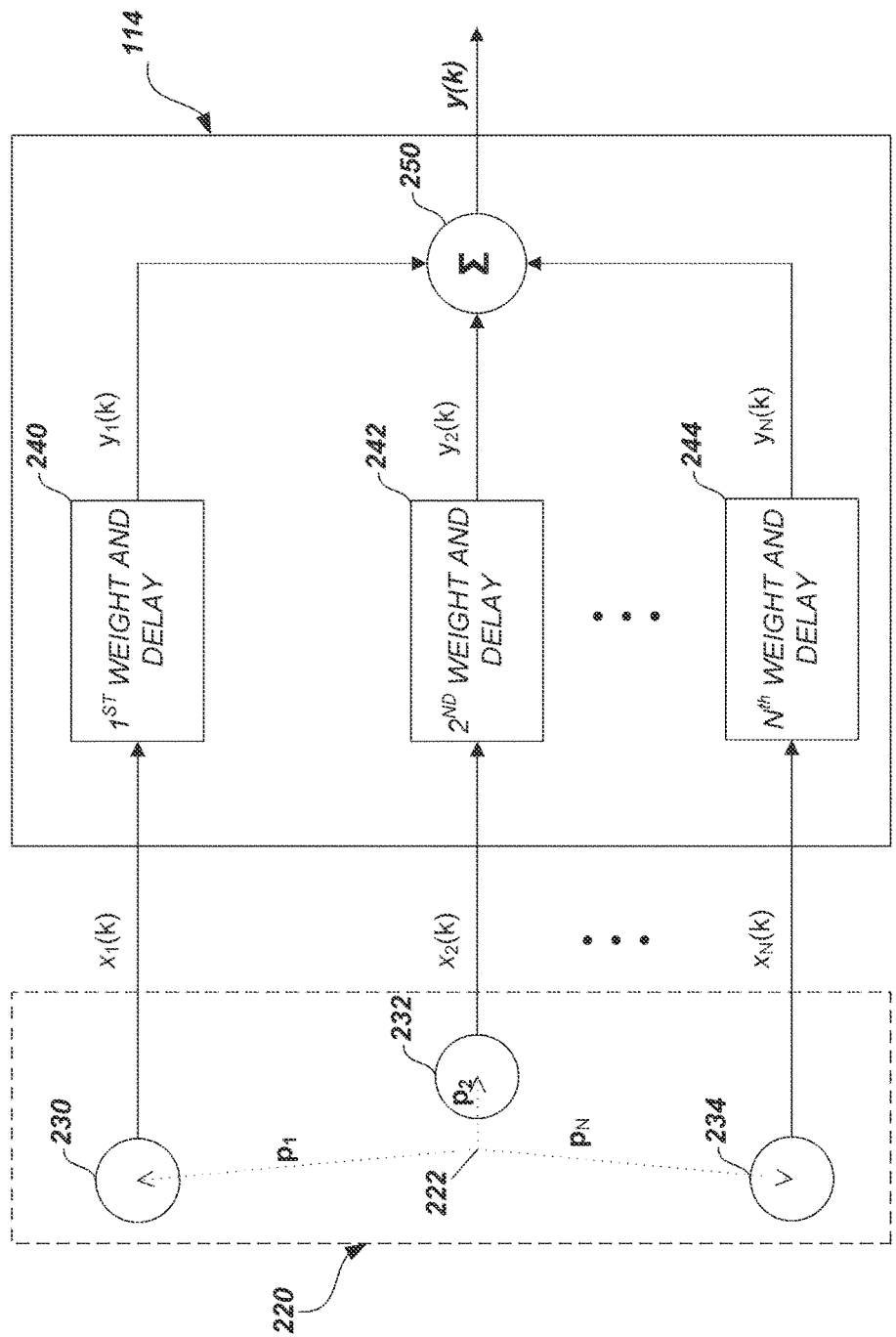
FIG. 2 is a signal diagram depicting an example of a sensor array and beamformer module according to an embodiment.

FIG. 2 is a diagram of a beamformer that illustrates the relationships between various signals and components that are relevant to beamforming and beamformed signal selection. Certain components of FIG. 2 correspond to components from FIGS. 1A and 1B, and retain the same numbering. These components include beamformer 114 and the microphone array 104 which is shown as a sensor array 220 in FIG. 2. The simplified view of the beamformer 114 shown in FIG. 2 omits additional elements (e.g., processor unit) which may be included in some implementations.

Generally, the sensor array 220 is a sensor array comprising N sensors that are adapted to detect and measure a source signal, such as a speaker's voice. As shown, the sensor array 220 is configured as a planar sensor array comprising three sensors, which correspond to a first sensor 230, a second sensor 232, and an Nth sensor 234. In other embodiments, the sensor array 220 can comprise of more than three sensors. In these embodiments, the sensors may remain in a planar configuration, or the sensors may be positioned apart in a non-planar three-dimensional region. For example, the sensors may be positioned as a circular array, a spherical array, another configuration, or a combination of configurations. In one embodiment, the beamformer 114 is a delay-and-sum type of beamformer adapted to use delays between each array sensor to compensate for differences in the propagation delay of the source signal direction across the array. By adjusting the beamformer's weights and delays (as discussed below), source signals that originate from a desired direction (or location) (e.g., from the direction of a person that is speaking, such as a person providing instructions and/or input to a speech recognition system) are summed in phase, while other signals (e.g., noise, non-speech, etc.) undergo destructive interference. By adjusting or selecting the weights and/or delays of a delay-and-sum beamformer, the shape of its beamformed signal output can be controlled. Other types of beamformer modules may be utilized, as well.

Figure 3:
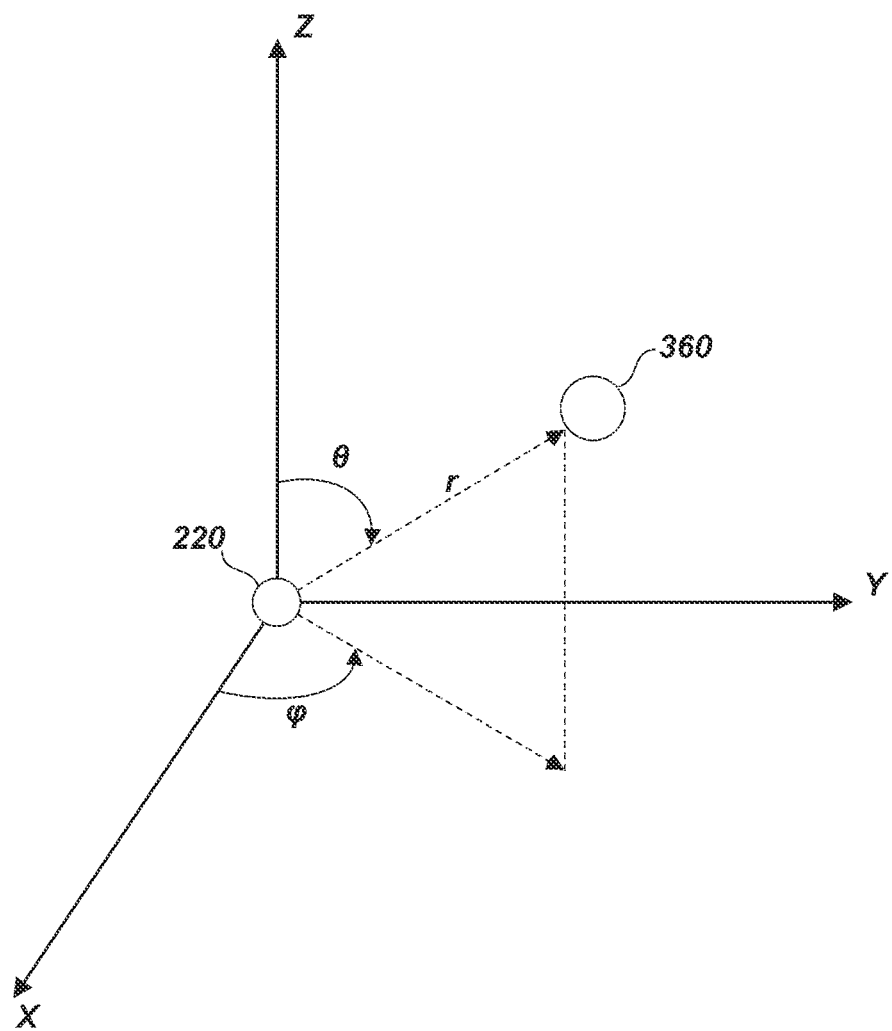
FIG. 3 is a diagram illustrating a spherical coordinate system according to an embodiment for specifying the location of a signal source relative to a sensor array.

The first sensor 230 can be positioned at a position $p_1$ relative to a center 222 of the sensor array 220, the second sensor 232 can be positioned at a position $p_2$ relative to the center 222 of the sensor array 220, and the Nth sensor 234 can be positioned at a position $p_N$ relative to the center 222 of the sensor array 220. The vector positions $p_1$, $p_2$, and $p_N$ can be expressed in spherical coordinates in terms of an azimuth angle $\phi$, a polar angle $\theta$, and a radius r, as shown in FIG. 3. Alternatively, the vector positions $p_1$, $p_2$, and $p_N$ can be expressed in terms of any other coordinate system.

Each of the sensors 230, 232, and 234 can comprise a microphone. In some embodiments, the sensors 230, 232, and 234 can be an omni-directional microphone having the same sensitivity in every direction. In other embodiments, directional sensors may be used.

Each of the sensors in sensor array 220, including sensors 230, 232, and 234, can be configured to capture input signals. In particular, the sensors 230, 232, and 234 can be configured to capture wavefields. For example, as microphones, the sensors 230, 232, and 234 can be configured to capture input signals representing sound. In some embodiments, the raw input signals captured by sensors 230, 232, and 234 are converted by the sensors 230, 232, and 234 and/or sensor array 220 (or other hardware, such as an analog-to-digital converter, etc.) to discrete-time digital input signals $x_1(k)$, $x_2(k)$, and $x_N(k)$, as shown on FIG. 2. Although shown as three separated signal channels for clarity, the data of input signals $x_1(k)$, $x_2(k)$, and $x_N(k)$ may be communicated by the sensor array 220 over a single data channel.

The discrete-time digital input signals $x_1(k)$, $x_2(k)$, and $x_N(k)$ can be indexed by a discrete sample index k, with each sample representing the state of the signal at a particular point in time. Thus, for example, the signal $x_1(k)$ may be represented by a sequence of samples $x_1(0), x_1(1), \ldots x_1(k)$. In this example the index k corresponds to the most recent point in time for which a sample is available.

A beamformer 114 may comprise filter blocks 240, 242, and 244 and summation module 250. Generally, the filter blocks 240, 242, and 244 receive input signals from the sensor array 220, apply filters (such as weights, delays, or both) to the received input signals, and generate weighted, delayed input signals as output. For example, the first filter block 240 may apply a first filter weight and delay to the first received discrete-time digital input signal $x_1(k)$, the second filter block 242 may apply a second filter weight and delay to the second received discrete-time digital input signal $x_2(k)$, and the Nth filter block 244 may apply an Nth filter weight and delay to the $N^{th}$ received discrete-time digital input signal $x_N(k)$. In some cases, a zero delay is applied, such that the weighted, delayed input signal is not delayed with respect to the input signal. In some cases, a unit weight is applied, such that the weighted, delayed input signal has the same amplitude as the input signal.

Summation module 250 may determine a beamformed signal y(k) based at least in part on the weighted, delayed input signals $y_1(k)$, $y_2(k)$, and $y_N(k)$. For example, summation module 250 may receive as inputs the weighted, delayed input signals $y_1(k)$, $y_2(k)$, and $y_N(k)$. To generate a spatially-filtered, beamformed signal y(k), the summation module 250 may simply sum the weighted, delayed input signals $y_1(k)$, $y_2(k)$, and $y_N(k)$. In other embodiments, the summation module 250 may determine a beamformed signal y(k) based on combining the weighted, delayed input signals $y_1(k)$, $y_2(k)$, and $y_N(k)$ in another manner, or based on additional information.

For simplicity, the manner in which beamformer 114 determines beamformed signal y(k) has been described with respect to a single beamformed signal (corresponding to a single look direction). However, it should be understood that beamformer 114 may determine any of a plurality of beamformed signals in a similar manner. Each beamformed signal y(k) is associated with a look direction for which a waveform detected by the sensor array from a direction other than the look direction is suppressed relative to a waveform detected by the sensor array from the look direction. The filter blocks 240, 242, and 244 and corresponding weights and delays may be selected to achieve a desired look direction. Other filter blocks and corresponding weights and delays may be selected to achieve the desired look direction for each of the plurality of beamformed signals. The beamformer 114 can determine a beamformed signal y(k) for each look direction.

In the embodiment of FIG. 2, weighted, delayed input signals may be determined by beamformer 114 by processing audio input signals $x_1(k)$, $x_2(k)$, and $x_N(k)$ from omni-directional sensors 230, 232, and 234. In other embodiments, directional sensors may be used. For example, a directional microphone has a spatial sensitivity to a particular direction, which is approximately equivalent to a look direction of a beamformed signal formed by processing a plurality of weighted, delayed input signals from omni-directional microphones. In such embodiments, determining a plurality of beamformed signals may comprise receiving a plurality of input signals from directional sensors. In some embodiments, beamformed signals may comprise a combination of input signals received from directional microphones and weighted, delayed input signals determined from a plurality of omni-directional microphones.

Turning now to FIG. 3, a spherical coordinate system according to an embodiment for specifying a look direction relative to a sensor array is depicted. In this example, the sensor array 220 is shown located at the origin of the X, Y, and Z axes. A signal source 360 (e.g., a user's voice) is shown at a position relative to the sensor array 220. In a spherical coordinate system, the signal source is located at a vector position r comprising coordinates (r, $\phi,\theta$), where r is a radial distance between the signal source 360 and the center of the sensor array 220, angle $\phi$ is an angle in the x-y plane measured relative to the x axis, called the azimuth angle, and angle $\theta$ is an angle between the radial position vector of the signal source 360 and the z axis, called the polar angle. Together, the azimuth angle $\phi$ and polar angle $\theta$ can be included as part of a single vector angle $\Theta=\{\phi, \theta\}$ that specifies the look direction of a given beamformed signal. In other embodiments, other coordinate systems may be utilized for specifying the position of a signal source or look direction of a beamformed signal. For example, the elevation angle may alternately be defined to specify an angle between the radial position vector of the signal source 360 and the x-y plane.

Figure 4:
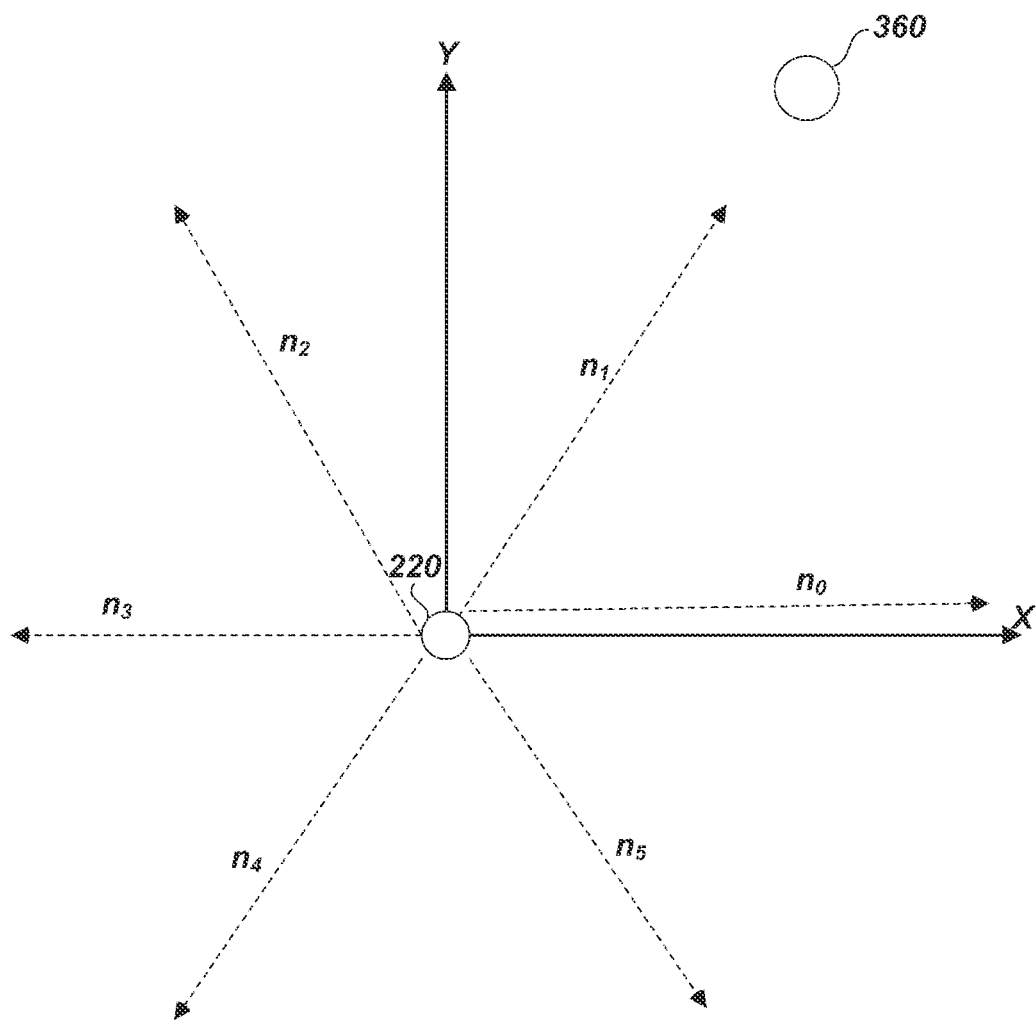
FIG. 4 is a diagram illustrating an example in two dimensions showing six beamformed signals and associated look directions.

Turning now to FIG. 4, a polar coordinate system is depicted for specifying look directions of each of a plurality of beamformed signals according to an embodiment. In the embodiment shown in FIG. 4, two-dimensional polar coordinates are depicted for ease of illustration. However, in other embodiments, the beamformed signals may be configured to have any look direction in a three-dimensional spherical coordinate system (e.g., the look direction for each of the plurality of beamformed signals may comprise an azimuth angle $\phi$ and polar angle $\theta$).

In the example of FIG. 4, there are six beamformed signals (N=6) determined from the input signals received by sensor array 220, where each beamformed signal corresponds to a different look direction. In other embodiments, there may be fewer or greater numbers of beamformed signals. Determining greater numbers of beamformed signals may provide for smaller angles between the look directions of neighboring beamformed signals, potentially providing for less error between the look direction of a selected beamformed signal and the actual direction of speech from a user 360. However, the reduced error would come at the cost of increased computational complexity. In FIG. 4, a zeroth beamformed signal comprises a look direction $n_0$ of approximately 0 degrees from the x axis. A first beamformed signal comprises a look direction $n_1$ of approximately 60 degrees from the x axis. A second beamformed signal comprises a look direction $n_2$ of approximately 120 degrees from the x axis. A third beamformed signal comprises a look direction $n_3$ of approximately 180 degrees from the x axis. A fourth beamformed signal comprises a look direction $n_4$ of approximately 240 degrees from the x axis. A fifth beamformed signal comprises a look direction $n_5$ of approximately 300 degrees from the x axis.

In the embodiment illustrated in FIG. 4, the look directions of each of the six beamformed signals are equally spaced apart. However, in other embodiments, other arrangements of look directions for a given number of beamformed signals may be chosen.

Beamformer 114 may determine a plurality of beamformed signals based on the plurality of input signals received by sensor array 220. For example, beamformer 114 may determine the six beamformed signals shown in FIG. 4. In one embodiment, the beamformer 114 determines all of the beamformed signals, each corresponding to a different look direction. For example, the beamformer module may determine each of the beamformed signals by utilizing different sets of filter weights and/or delays. A first set of filter weights and/or delays (e.g., 240, 242, 244) may be used to determine a beamformed signal corresponding to a first look direction. Similarly, a second set of filter weights and/or delays (e.g., 240, 242, 244) may be used to determine a second beamformed signal corresponding to a second direction, etc. Such techniques may be employed by using an adaptive or variable beamformer that implements adaptive or variable beamforming techniques. In another embodiment, multiple beamformer modules (e.g., multiple fixed beamformer modules) are provided. Each beamformer module utilizes a set of filter weights and/or delays to determine a beamformed signal corresponding to a particular look direction. For example, six fixed beamformer modules may be provided to determine the six beamformed signal, each beamformed signal corresponding to a different look direction. Whether fixed or adaptive beamformers are used, the resulting plurality of beamformed signals may be represented in an array of numbers in the form y(n)(k):

{y(1)(k), y(2)(k), . . . , y(N)(k)}, where "k" is a time index and "n" is an audio stream index (or look direction index) corresponding to the nth beamformed signal (and nth look direction). For example, in the embodiment shown in FIG. 4, N=6.

The beamformer 114, the beam selector 120, or a processing unit coupled therewith may determine, for each of the plurality of beamformed signals, a plurality of signal features based on each beamformed signal. In some embodiments, each signal feature is determined based on the samples of one of a plurality of frames of a beamformed signal. For example, a signal-to-noise ratio may be determined for a plurality of frames for each of the plurality of beamformed signals. The signal features f may be determined for each of the plurality of beamformed signals for each frame, resulting in an array of numbers in the form f(n)(k):

{f(1)(k), f(2)(k), . . . , f(N)(k)}, where "k" is the time index and "n" is the audio stream index (or look direction index) corresponding to the nth beamformed signal.

In other embodiments, other signal features may be determined, including an estimate of at least one of a spectral centroid, a spectral flux, a 90th percentile frequency, a periodicity, a clarity, a harmonicity, or a 4 Hz modulation energy of the beamformed signals. For example, a spectral centroid generally provides a measure for a centroid mass of a spectrum. A spectral flux generally provides a measure for a rate of spectral change. A $90^{th}$ percentile frequency generally provides a measure based on a minimum frequency bin that covers at least 90% of the total power. A periodicity generally provides a measure that may be used for pitch detection in noisy environments. A clarity generally provides a measure that has a high value for voiced segments and a low value for background noise. A harmonicity is another measure that generally provides a high value for voiced segments and a low value for background noise. A 4 Hz modulation energy generally provides a measure that has a high value for speech due to a speaking rate. These enumerated signal features that may be used to determine f are not exhaustive. In other embodiments, any other signal feature may be provided that is some function of the raw beamformed signal data over a brief time window (e.g., typically not more than one frame).

The beamformer 114, the beam selector 120, or a processing unit coupled therewith may determine, for each of the pluralities of signal features (e.g., for each of the plurality of beamformed signals), a smoothed signal feature S based on a time-smoothed function of the signal features foyer the plurality of frames. In some embodiments, the smoothed feature S is determined based on signal features over a plurality of frames. For example, the smoothed feature S may be based on as few as three frames of signal feature data to as many as a thousand frames or more of signal feature data. The smoothed feature S may be determined for each of the plurality of beamformed signals, resulting in an array of numbers in the form S(n)(k):

{S(1)(k), S(2)(k), . . . , S(N)(k)}

In general, signal measures (sometimes referred to as metrics) are statistics that are determined based on the underlying data of the signal features. Signal metrics summarize the variation of certain signal features that are extracted from the beamformed signals. An example of a signal metric can be the peak of the signal feature that denotes a maximum value of the signal over a longer duration. Such a signal metric may be smoothed (e.g., averaged, moving averaged, or weighted averaged) over time to reduce any short-duration noisiness in the signal features.

The beamformer 114, the beam selector 120, or a processing unit coupled therewith may determine which of the beamformed signals corresponds to a maximum of the smoothed feature S. For example, the beam selector 120 may determine, for a given time index k, which beamformed signal corresponds to a maximum of the signal metrics based on the following process:

$$j=\operatorname{argmax}\{S(1)(k), S(2)(k), \ldots, S(N)(k)\}$$

This process applies the argmax ( ) operator (e.g., that returns the maximum of the argument) on the smoothed signal feature $S(n)(k)$ (e.g., a smoothed peak signal feature) as distinguished from the raw signal features $f(n)(k)$.

In general, signal measures (sometimes referred to as metrics) are statistics that are determined based on the underlying data of the signal features. Signal metrics summarize the variation of certain signal features that are extracted from the beamformed signals. An example of a signal metric can be the peak of the signal feature that denotes a maximum value of the signal over a longer duration. Such a signal metric may be smoothed (e.g., averaged, moving averaged, or weighted averaged) over time to reduce any short-duration noisiness in the signal features.

Figure 5:
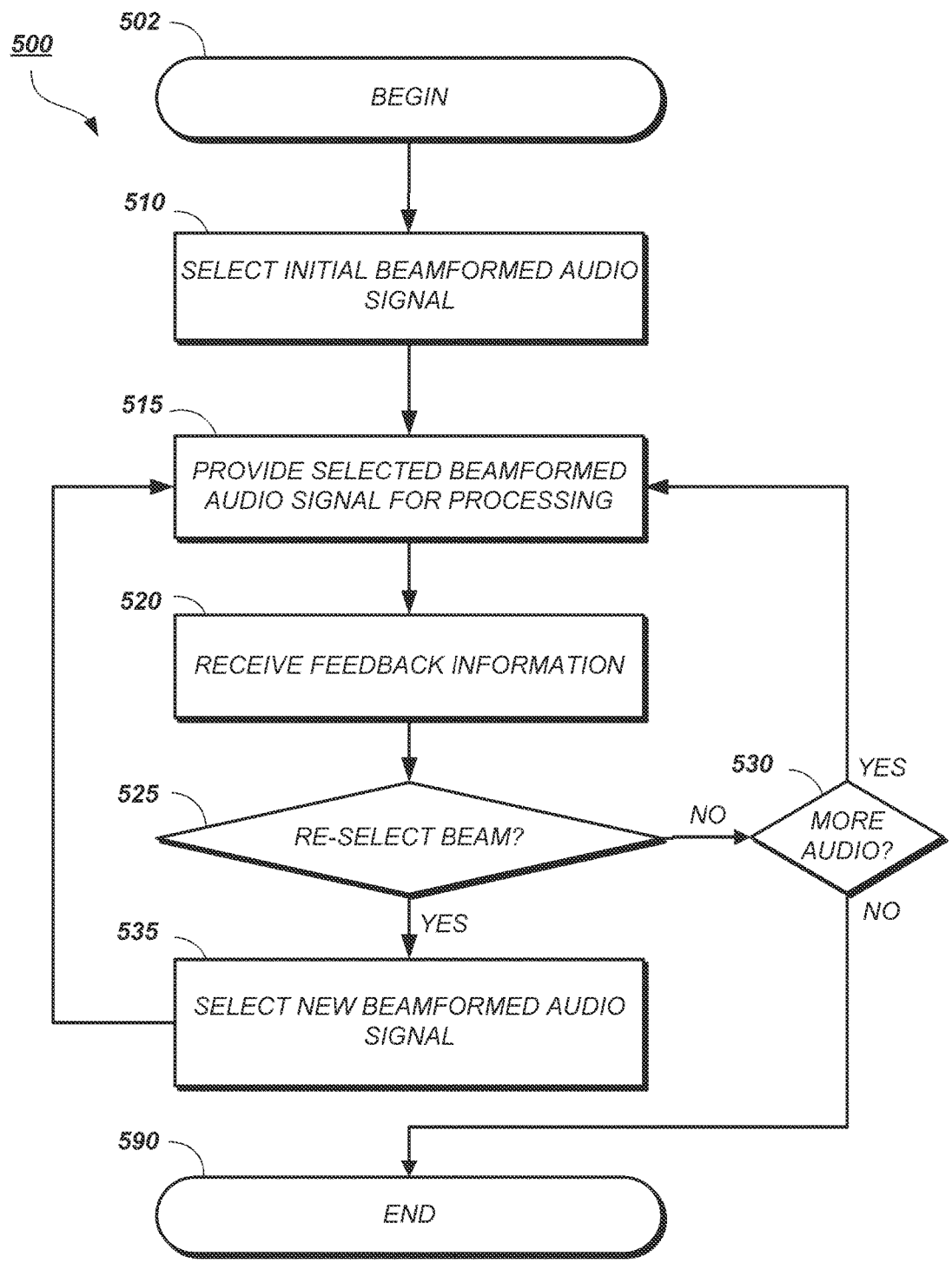
FIG. 5 shows a process flow diagram of an exemplary method of feedback based beamformed signal selection.

FIG. 5 shows a process flow diagram of an exemplary method for feedback based beamformed signal selection. The method 500 may be implemented in whole or in part by one or more of the devices shown such as the speech processing system 100 of FIG. 1A or 1B.

The method 500 begins at block 502. The method 500 assumes that audio signals have been received for a detected sound and that there are at least two beamformed audio signals to choose from, each corresponding to a direction of the detected sound.

At block 510, an initial beamformed audio signal is selected. The selection may be performed using metrics such as the peak SNR. In some implementations, a voice activity detector module may be used to select an initial beamformed audio signal. To select using peak SNR, a peak SNR is obtained for each beamformed audio signal. The beamformed audio signal with the highest peak SNR may then be selected as the "best" beam.

At block 515, the selected beamformed audio signal is provided for speech processing. The selected beamformed audio signal may be provided to a speech processing device such as a wake-word detector or an ASR engine.

At block 520, feedback information is received from the speech processing. The feedback may include binary feedback information such as wake-word detection information (e.g., a value of 1=wake word detected and a value of 0=wake word not detected). It may be desirable to receive the feedback within a known period of time such as within 1 second of initial beam selection. In some implementations, the feedback information may be stored such as in the selection data store 180.

At block 525, a determination is made as to whether the initial beamformed audio signal is appropriate or if beam selection should be performed again. The determination may be performed by comparing received feedback information to one or more feedback information conditions. A feedback information condition indicates feedback information values which indicate a need for reconsideration of the beam selection. For example, consider implementations where wake-word feedback is provided as an input to the beam selection. A feedback information condition may indicate that if the feedback indicates that a wake-word is detected, the speech processing system will continue to process audio from the initially selected beam. This may include ignoring other evidence, such as changes in peak SNR. The initially selected beam is defined as the beam that was selected prior to wake-word end-pointing and detection. The speech processing system be forced to switch to the initially selected beam or may adjust a configuration to maintain the initially selected beamformed audio signal. For example, when a voice activity detector is included, the voice activity detector time constants indicating periods of time for detection and beamformed audio selection can be adjusted to be smoother. The adjustment causes the system to maintain a selected beam for a longer period of time if, for example, a wake-word is detected. Because the system can process the selected beam the need to change is reduced as compared to the case where no wake-word is detected perhaps due to poor beam quality. This smoothing provides a non-limiting advantage of increasing the tolerance of the system to noise or random sound events. In a non-smoothed implementation, any detection of noise or random sound events may trigger reselection of beams (and the associated resources to perform the reselection). In a smoothed implementation, the system may defer reselection of the beam based on a subsequent occurrence of a noise event or longer duration of a noise event which could be indicative of a true change in the focal point rather than a random event (e.g., cough, sneeze, passing car).

If the determination at block 525 is negative and no re-selection is needed, the method 500 continues to decision block 530. At block 530, a determination is made as to whether there is additional audio signal to process. If so, the method 500 returns to block 515 to continue using the selected beamformed audio signal for processing. If no further audio signals require processing, the method 500 ends at block 590.

Returning to block 525, if the determination is affirmative and re-selection is needed, the method 500 continues to block 535. At block 535, a new beamformed audio signal is selected for processing. In some instances, after re-evaluating the available beams, it may be determined that the initially selected beam is still the best beam. However, unlike the initial beamformed audio signal selection at block 510, the selection at block 535 may benefit from feedback information. The feedback information may be received for the selected beam as well as other alternative beams. This may help the beam selection avoid confusion between two beamformed audio signals which may be suitable for processing.

Figure 6:
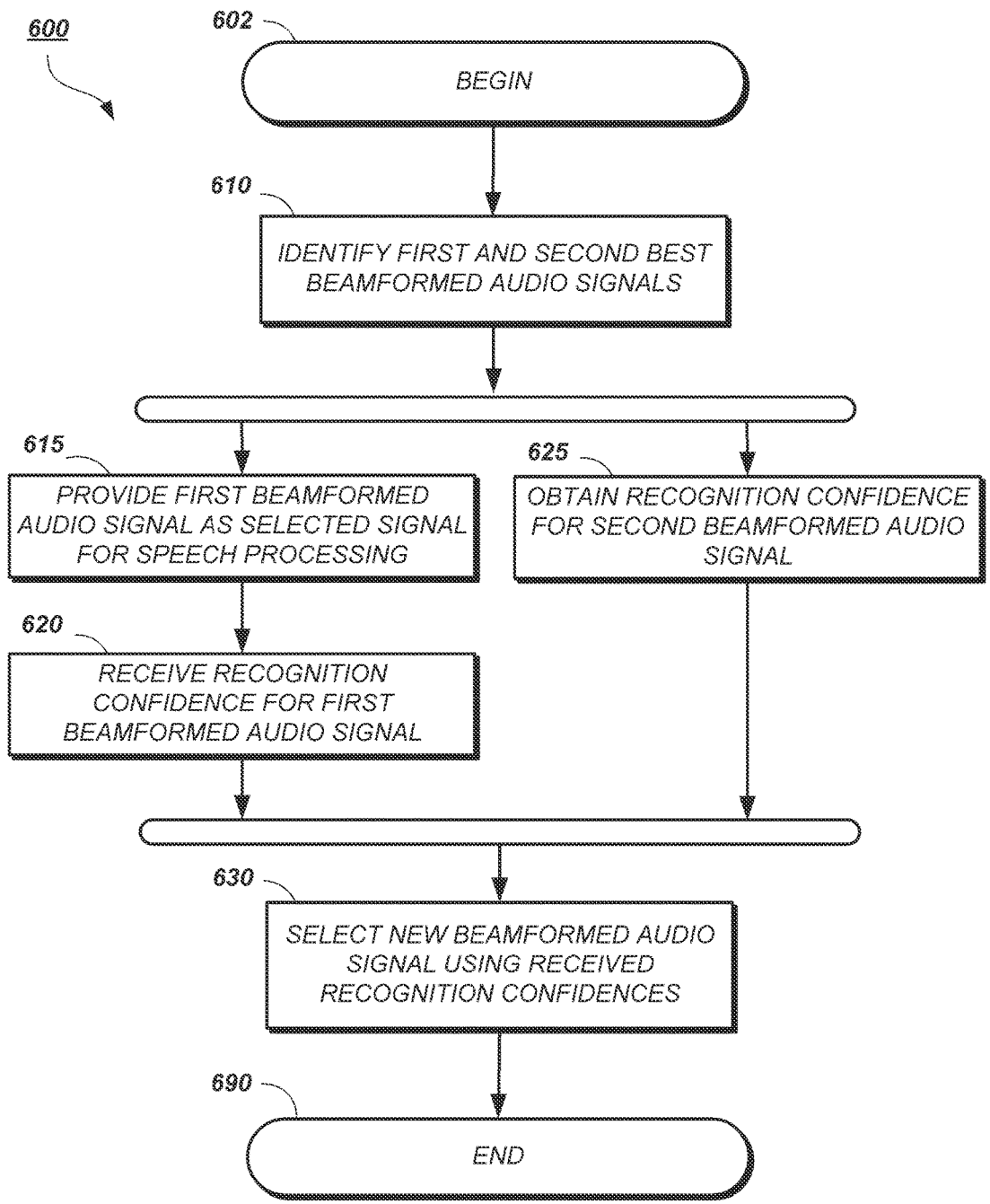
FIG. 6 shows a process flow diagram of an exemplary method of feedback based beamformed signal selection.

FIG. 6 shows a process flow diagram of an exemplary method of feedback based beamformed signal selection. The method 600 may be implemented in whole or in part by one or more of the devices shown such as the speech processing system 100 of FIG. 1A or 1B. The method 600 shown is one way feedback information may be used to assist in selecting a beamformed audio signal.

The method 600 begins at block 602. The method 600 assumes that audio signals have been received for a detected sound and that there are at least two beamformed audio signals to choose from, each corresponding to a direction of the detected sound.

At block 610, the method 600 identifies the top two beamformed audio signals. In one implementation, this may include ranking the beamformed audio signals based on a metric such as peak signal-to-noise ratio. In some implementations, the ranking may be further based on feedback information. For example, a beam which has detected a wake-work may be ranked below a beam which has both detected and identified a wake-word. Similarly, a beam which provided data resulting in a high confidence recognition detection via an ASR engine may be ranked higher than a beam which provided data resulting in a lower confidence recognition.

Having identified the top two beamformed audio signals, the method 500 may proceed in parallel. In one path, at block 615, the first beamformed audio signal (e.g., the "best" signal), is provided for processing. The first beamformed audio signal will be the source for audio data for the speech processing system function (e.g., speech recognition, natural language processing, etc.). The processing may include wake-word detection via a wake-word detector. The processing may include automatic speech recognition via an ASR engine.

As part of the processing, feedback information may be received. As shown in FIG. 6, the method 600 receives speech recognition confidence for one or more words included in (e.g., represented by) the first beamformed audio signal. The speech recognition confidence indicates how likely the word or words recognized by the ASR engine are to be accurate.

During or at a substantially similar time as the processing of the first beamformed audio signal, at block 625, speech recognition confidence for the second beamformed audio signal may be obtained. Obtaining the confidence may include transmitting the second beamformed audio signal to an ASR engine and receiving ASR feedback including the recognition confidence information.

At block 630, the need to select a new beamformed audio signal may arise and a new beamformed audio signal selection is performed. The need may be due to the passage of time since the last evaluation, degradation of the first beamformed audio signal, or other system event. The selection may use the received recognition confidences for the first and second beamformed audio signals. The selection may further consider other metrics for the signals such a peak signal-to-noise ratios.

While the method 600 shown in FIG. 6 describes using ASR feedback, other feedback information may be obtained and used to reduce confusion during the beamformed audio signal selection. For example, detection of a wake-word in the beamformed audio signal may be used to rank the beams. As another factor, recognition of a wake-word may be used as a factor to rank the beams. Yet another factor may be successful submission of a wake-word for ASR. As a further factor, goal achievement (e.g., execution of a system response) may be used for ranking.

With one or more of these feedback information data points, the system may resolve confusion between two or more plausible beams and the differences in peak SNR between the beams.

The resolution may be implemented using a formula expressing the relationship for the factors. The formula may be a linear or non-linear expression of the feedback or other beam selection factors. Equation 1 below is one example expression of a relationship between several feedback information elements that may be combined to generate a score for a beamformed audio signal.

$$peak\_snr+(0.3*wake\ detect)\hat{\ }wake\_recog\_conf+ \\ (0.6*asr\_query)\hat{\ }asr\_recog\_conf+goal\_ach \quad \text{Equation (1)}$$

where peak_snr is the audio signal's peak signal-to-noise ratio, wake detect is a binary feedback from a wake-word detector indicating whether (1) or not (0) a wake-word was detected, wake_recog_conf is feedback from a wake-word detector indicating a degree of confidence for recognizing a wake word where a value of (0) indicates no recognition of a wake word, asr_query is a binary feedback from an ASR engine indicating whether (1) or not (0) an ASR engine was queried with the detected wake-word, asr_recog_conf is feedback from an ASR engine indicating a degree of confidence for recognizing a word where a value of (0) indicates no recognition of a word, and goal_ach is a binary feedback indicating whether (1) or not (0) a system response was triggered.

In some implementations, it may be desirable to provide the feedback in binary format whereby the conditions identified within the feedback are limited to 0 or 1. Such implementations can enhance the efficiency of the selection process by reducing the quantity of information the beam selector 120 considers in making the selection.

Having selected a beamformed audio signal, at block 690, the method 600 ends.

Figure 7:
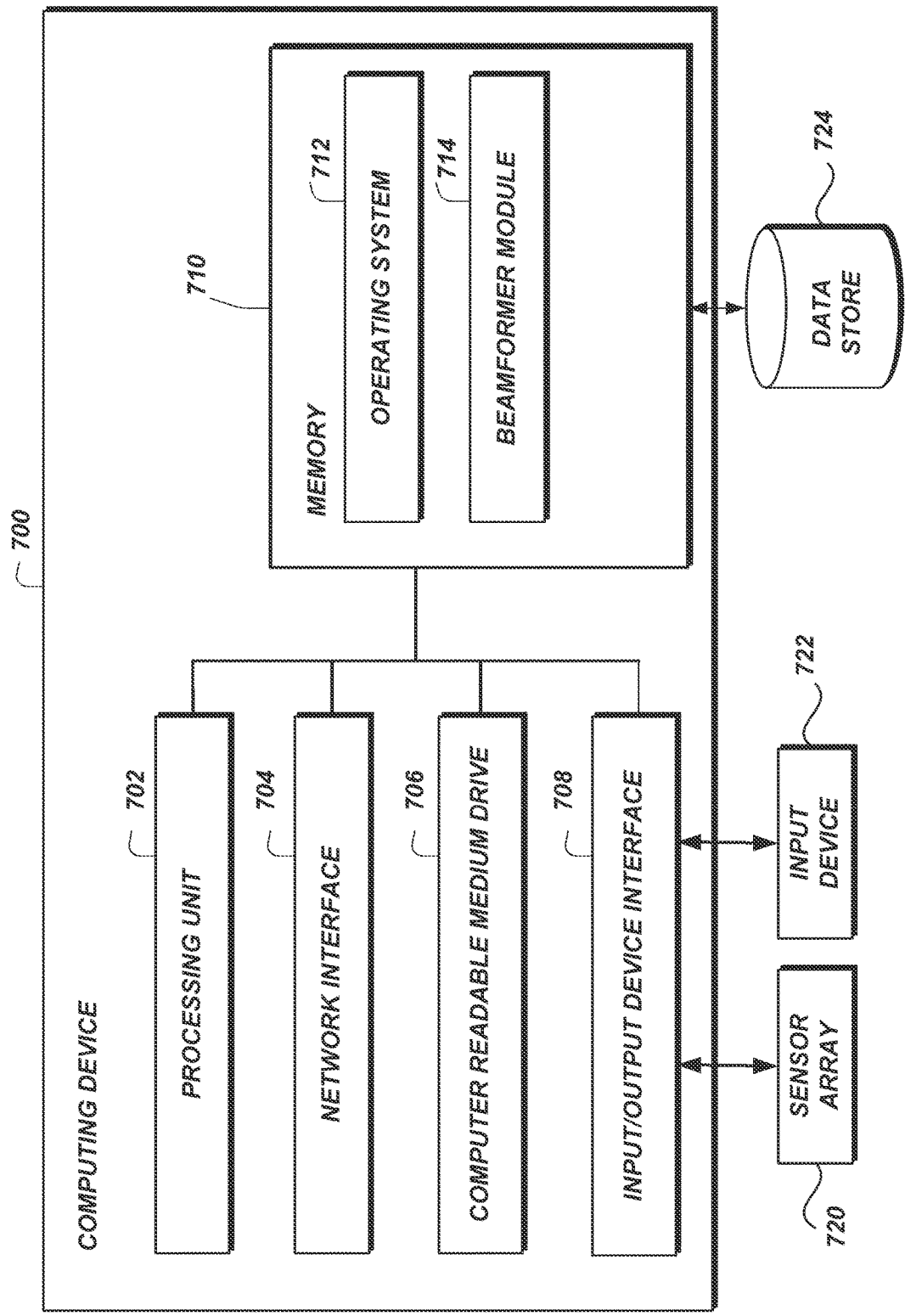
FIG. 7 shows a functional block diagram of an example computing device for feedback based beamforming and beamformed signal selection.

FIG. 7 shows a functional block diagram of an example computing device for feedback based beamforming and beamformed signal selection. The computing device 700 configured to execute some or all of the processes and embodiments described herein. For example, computing device 700 may be implemented by any computing device, including a telecommunication device, a cellular or satellite radio telephone, a laptop, tablet, or desktop computer, a digital television, a personal digital assistant (PDA), a digital recording device, a digital media player, a video game console, a video teleconferencing device, a medical device, a sonar device, an underwater echo ranging device, a radar device, or by a combination of several such devices, including any in combination with a network-accessible server. The computing device 700 may be implemented in hardware and/or software using techniques known to persons of skill in the art.

The computing device 700 can comprise a processing unit 702, a network interface 704, a computer readable medium drive 706, an input/output device interface 708 and a memory 710. The network interface 704 can provide connectivity to one or more networks or computing systems. The processing unit 702 can receive information and instructions from other computing systems or services via the network interface 704. The network interface 704 can also store data directly to memory 710. The processing unit 702 can communicate to and from memory 710. The input/output device interface 708 can accept input from the optional input device 722, such as a keyboard, mouse, digital pen, microphone, camera, etc. In some embodiments, the optional input device 722 may be incorporated into the computing device 700. Additionally, the input/output device interface 708 may include other components including various drivers, amplifier, preamplifier, front-end processor for speech, analog to digital converter, digital to analog converter, etc.

The memory 710 may contain computer program instructions that the processing unit 702 executes in order to implement one or more embodiments. The memory 710 generally includes RAM, ROM and/or other persistent, non-transitory computer-readable media. The memory 710 can store an operating system 712 that provides computer program instructions for use by the processing unit 702 in the general administration and operation of the computing device 700. The memory 710 can further include computer program instructions and other information for implementing aspects of the present disclosure. For example, in one embodiment, the memory 710 includes a beamformer module 714 that performs signal processing on input signals received from the sensor array 720. For example, the beamformer module 714 can form a plurality of beamformed signals using the received input signals and a different set of filters for each of the plurality of beamformed signals. The beamformer module 714 can determine each of the plurality of beamformed signals to have a look direction (sometimes referred to as a direction) for which a waveform detected by the sensor array from a direction other than the look direction is suppressed relative to a waveform detected by the sensor array from the look direction. The look direction of each of the plurality of beamformed signals may be equally spaced apart from each other, as described in more detail below in connection with FIG. 4. The beamformer module 714 may be further configured to perform the methods of feedback based beam selection such as that shown in FIG. 5 and/or FIG. 6.

Memory 770 may also include or communicate with one or more auxiliary data stores, such as data store 724. Data store 724 may electronically store data regarding determined beamformed signals and associated filters.

In some embodiments, the computing device 700 may include additional or fewer components than are shown in FIG. 7. For example, a computing device 700 may include more than one processing unit 702 and computer readable medium drive 706. In another example, the computing device 700 may not include or be coupled to an input device 722, include a network interface 704, include a computer readable medium drive 706, include an operating system 712, or include or be coupled to a data store 724. In some embodiments, two or more computing devices 700 may together form a computer system for executing features of the present disclosure.

One implementation of the above features may be included in an apparatus. The apparatus includes a microphone array including a plurality of microphones. The array is configured to generate input audio signals representing sound detected by the microphone array. The apparatus further includes one or more processors in data communication with the microphone array. The one or more processors are configured to generate a beamformed audio signal by adjusting at least one of a phase or an amplitude of at least one of the audio signals. Each of the beamformed audio signal corresponds a direction. The processors are further configured to select an initial beamformed audio signal audio signal that is associated with an initial beam. The processors are further configured to send the initial beamformed audio signal to a speech processing component such as a wake-word engine or a speech recognition engine. The processors are further configured to receive feedback information from the speech processing component for the initial beamformed audio signal. The feedback information includes at least one of a detection result for a wake-word in the initial being formed audio signal, or a speech recognition confidence for speech recognized in the initial beamformed audio signal. The processors are further configured to select a second beamformed audio signal associated with a second beam in response to the detection result indicating a failure to detect the wake word in the initial beamformed audio signal or the speech recognition confidence is less than a minimum beam recognition confidence for the speech recognized in the initial beamformed audio signal.

In some implementations of the apparatus, the one or more processors are configured to receive second feedback information for the second beamformed audio signal. In such implementations, the second beamformed audio signal may be selected using a comparison of the feedback information for the initial beamformed audio signal and the second feedback information for the second beamformed audio signal. The second feedback information may indicate detection of the wake-word and the second feedback information indicates a second speech recognition confidence which exceeds the speech recognition confidence for the speech recognized in the initial beamformed audio signal.

In some implementations of the apparatus, a memory may be included. The memory may store beam selection information for several beams including the initial and second beams. The beam selection information may indicate a number of times each respective beam was associated with particular feedback information such as information indicating detection of the wake-word in a signal from the respective beam by the wake-word engine, or recognition of the wake-word in a signal from the respective beam by the speech recognition engine or initiation of a system action in response to a signal from the respective beam. The processors of the apparatus may be configured to select the second beamformed audio signal using a comparison of the beam selection information for the initial beam and the second beam.

The features describe in the application may be embodied in a computer-implemented method. Under control of one or more computing devices configured with specific computer-executable instructions, the method may include receiving beamformed audio signals for a sound, each signal corresponding to a direction. The method further includes selecting an initial beamformed audio signal from the beamformed audio signals for speech processing, the initial beamformed audio signal associated with an initial beam. The method also includes sending the initial beamformed audio signal to a speech processing component and receiving feedback information from the speech processing component, the feedback information associated with the initial beamformed audio signal. The method includes determining, using the feedback information, that beamformed audio signal selection is to be performed. The method also includes selecting, in response to determining that the beamformed audio signal selection is to be performed, the initial beamformed audio signal or a second beamformed audio signal from the beamformed audio signals for the speech processing, where the second beamformed audio signal is associated with a second beam.

In some implementations, the feedback information may indicate whether a wake-word is detected in the initial beamformed audio signal. In such implementations, the beamformed audio signal selection is determined to be performed when the feedback information indicates failure to detect the wake-word.

In some implementations, the feedback information may additionally or alternatively include a recognition confidence for speech included in the initial beamformed audio signal. In such implementations including recognition confidence, the beamformed audio signal selection is determined to be performed when the recognition confidence is less than a minimum confidence threshold.

One or more aspects described above may be implemented by a specifically configured device including a receiver and a beam selector.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. An apparatus comprising:
   a microphone array including a plurality of microphones, the microphone array configured to generate a plurality of input audio signals representing sound detected by the microphone array;
   one or more processors in communication with the microphone array, the one or more processors configured to:
      generate a first beamformed audio signal using at least two of the plurality of input audio signals by adjusting at least one of a phase or an amplitude of at least one of the at least two of the plurality of input audio signals, the first beamformed audio signal associated with a first beam having a first direction;
      generate a second beamformed audio signal using at least two of the plurality of input audio signals by adjusting at least one of a phase or an amplitude of at least one of the at least two of the plurality of input audio signals, the second beamformed audio signal associated with a second beam having a second direction;
      select the first beamformed audio signal for speech processing by a speech processing component;
      send the first beamformed audio signal to the speech processing component, wherein the speech processing component includes at least one of a wake-word engine or a speech recognition engine;
      receive feedback information from the speech processing component for the first beamformed audio signal, wherein the feedback information includes at least one of:
         a detection result for a wake word in the first beamformed audio signal from the wake-word engine; or
         a speech recognition confidence for speech content recognized in the first beamformed audio signal from the speech recognition engine;
      select the second beamformed audio signal for speech processing by the speech processing component in response to:
         the detection result from the wake-word engine indicating a failure to detect the wake word in the first beamformed audio signal; or
         the speech recognition confidence from the speech recognition engine being less than a minimum beam recognition confidence for the speech content recognized in the first beamformed audio signal; and
      send the second beamformed audio signal to the speech processing component.

2. The apparatus of claim 1, wherein the one or more processors are configured to receive second feedback information for the second beamformed audio signal, wherein the second beamformed audio signal is selected using a comparison of the feedback information for the first beamformed audio signal and the second feedback information for the second beamformed audio signal, wherein the second feedback information indicates detection of the wake-word and the second feedback information indicates a second speech recognition confidence which exceeds the speech recognition confidence for the speech content recognized in the first beamformed audio signal.

3. The apparatus of claim 1, further comprising a memory storing beam selection information for a plurality of beams, the plurality of beams including the first beam and the second beam, the beam selection information indicating a number of times each respective beam was associated with feedback information indicating at least one of:
  detection of the wake-word in a signal from the respective beam by the wake-word engine;
  recognition of the wake-word in a signal from the respective beam by the speech recognition engine; or
  initiation of a system action in response to a signal from the respective beam,
  wherein the one or more processors are further configured to select the second beamformed audio signal using a comparison of the beam selection information for the first beam and the second beam.

4. A computer-implemented method comprising:
  under control of one or more computing devices configured with specific computer-executable instructions,
    receiving a plurality of beamformed audio signals for a sound, each of the plurality of beamformed audio signals corresponding to a direction, and each of the plurality of beamformed audio signals formed from at least two different audio signals;
    selecting a first beamformed audio signal from the plurality of beamformed audio signals for speech processing, the first beamformed audio signal associated with a first beam having a first direction;
    sending the first beamformed audio signal to a speech processing component configured to identify speech content represented in the first beamformed audio signal;
    receiving feedback information from the speech processing component, the feedback information associated with the speech content represented in the first beamformed signal, wherein the feedback information indicates at least one of: whether a wake-word is detected in the first beamformed audio signal, or a speech recognition confidence for speech content represented in the first beamformed audio signal;
    determining that beamformed audio signal selection is to be performed based at least in part on the feedback information indicating at least one of: a failure to detect the wake-word, or the speech recognition confidence being less than a minimum confidence threshold;
    selecting, in response to determining that the beamformed audio signal selection is to be performed, a second beamformed audio signal from the plurality of beamformed audio signals for the speech processing, wherein the second beamformed audio signal is associated with a second beam having a second direction; and
    sending the second beamformed audio signal to the speech processing component to identify speech content represented in the second beamformed audio signal.

5. The computer-implemented method of claim 4, wherein the speech processing component comprises a wake-word detector, the wake-word detector configured to:
  detect a word included in the first beamformed audio signal; and
  send the feedback information for the first beamformed audio signal, the feedback information including a detection result indicating whether the word was detected in the first beamformed audio signal.

6. The computer-implemented method of claim 5, wherein the wake-word detector is further configured to:
  transmit the first beamformed audio signal to an automatic speech recognition engine, the automatic speech recognition engine configured to:
    generate a recognition response including a word recognized from the first beamformed audio signal and a recognition confidence for the word; and
    send recognition processing feedback for the first beamformed audio signal, the recognition processing feedback including a speech recognition confidence for speech recognized in the first beamformed audio signal; and
  receive the recognition processing feedback,
  wherein the feedback information includes the recognition processing feedback.

7. The computer-implemented method of claim 4, wherein the speech processing component comprises an automatic speech recognition engine, the automatic speech recognition engine configured to:
  recognize a word represented in the first beamformed audio signal; and
  send the feedback information for the first beamformed audio signal, the feedback information including a speech recognition confidence for the word recognized in the first beamformed audio signal.

8. The computer-implemented method of claim 4, further comprising:
  providing the second beamformed audio signal to the speech processing component; and
  receiving second feedback information for the second beamformed audio signal,
  wherein selecting the second beamformed audio signal includes comparing the feedback information and the second feedback information.

9. The computer-implemented method of claim 8, further comprising storing the feedback information for respective signals from the first beam and the second beam, said respective signals obtained over a period of time, wherein said selecting the second beamformed audio signal is based on a comparison of the feedback information for the first beam with the second beam obtained over the period of time.

10. The computer-implemented method of claim 4, further comprising storing selection information for a plurality of beams, the plurality of beams including the first beam and the second beam, the selection information indicating a number of times each respective beam was selected, wherein said selecting the second beamformed audio signal is based on a comparison of the selection information for the first beam with the selection information for the second beam.

11. A device comprising:
  a receiver configured to receive a plurality of beamformed audio signals for a sound, each of the plurality of beamformed audio signals corresponding to a direction, and each of the plurality of beamformed audio signals formed from at least two different audio signals;
  a beam selector in data communication with the receiver, the beam selector configured to:

select a first beamformed audio signal from the plurality of beamformed audio signals for speech processing, the first beamformed audio signal associated with a first beam having a first direction; and send the first beamformed audio signal to a speech processing component configured to identify speech content represented in the first beamformed audio signal;

receive feedback information from the speech processing component, the feedback information associated with the speech content represented in the first beamformed audio signal, wherein the feedback information indicates at least one of:

whether a wake-word is detected in the first beamformed audio signal, or a speech recognition confidence for speech content represented in the first beamformed audio signal;

determining that beamformed audio signal selection is to be performed based at least in part on the feedback information indicating at least one of: a failure to detect the wake-word, or the speech recognition confidence being less than a minimum confidence threshold;

select, in response to determining that the beamformed audio signal selection is to be performed, a second beamformed audio signal from the plurality of beamformed audio signals for the speech processing, wherein the second beamformed audio signal is associated with a second beam having a second direction; and send the second beamformed audio signal to the speech processing component to identify speech content represented in the second beamformed audio signal.

12. The device of claim 11, wherein the speech processing component comprises a wake-word detector in data communication with the beam selector, the wake-word detector configured to:

detect a word included in the first beamformed audio signal; and send the feedback information for the first beamformed audio signal, the feedback information including a detection result indicating whether the word was detected in the first beamformed audio signal.

13. The device of claim 12, wherein the wake-word detector is further configured to:

transmit the first beamformed audio signal to an automatic speech recognition engine, the automatic speech recognition engine configured to:

generate a recognition response including a word recognized from the first beamformed audio signal and a recognition confidence for the word, and send recognition processing feedback for the first beamformed audio signal, the recognition processing feedback including a speech recognition confidence for speech recognized in the first beamformed audio signal; and receive the recognition processing feedback, wherein the feedback information includes the recognition processing feedback.

14. The device of claim 11, wherein the speech processing component comprises an automatic speech recognition engine in data communication with the beam selector, the automatic speech recognition engine configured to:

recognize a word represented in the first beamformed audio signal; and send the feedback information for the first beamformed audio signal, the feedback information including a speech recognition confidence for the word recognized in the first beamformed audio signal.

15. The device of claim 11, wherein the beam selector is further configured to:

provide the second beamformed audio signal to the speech processing component; and receive second feedback information for the second beamformed audio signal, wherein selecting the second beamformed audio signal includes comparing the feedback information and the second feedback information.

16. The device of claim 15, further comprising a memory in data communication with the beam selector, wherein the beam selector is configured to store, in the memory, the feedback information for respective signals from the first beam and the second beam, the respective signals received obtained over a period of time, wherein said selecting the second beamformed audio signal is based on a comparison of the feedback information for the first beam and the second beam obtained over the period of time.

17. The computer-implemented method of claim 11, further comprising a memory in data communication with the beam selector, wherein the beam selector is configured to store, in the memory, selection information for a plurality of beams, the plurality of beams including the first beam and the second beam, the selection information indicating a number of times each respective beam was selected, wherein said selecting the second beamformed audio signal is based on a comparison of the selection information for the first beam with the selection information for the second beam.

* * * * *

UNITED STATES PATENT AND TRADEMARK OFFICE
CERTIFICATE OF CORRECTION

PATENT NO. : 9,734,822 B1
APPLICATION NO. : 14/727504
DATED : August 15, 2017
INVENTOR(S) : Shiva Kumar Sundaram It is certified that error appears in the above-identified patent and that said Letters Patent is hereby corrected as shown below:

In the Specification

In Column 13 at Line 64, Change "wake detect" to --wake_detect--.

In Column 21 at Line 19, Change "determining" to --determine--.

In the Claims

In Column 22 at Line 39, In Claim 17, change "The computer-implemented method" to --The device--.

Signed and Sealed this
Twelfth Day of December, 2017

Joseph Matal
*Performing the Functions and Duties of the
Under Secretary of Commerce for Intellectual Property and
Director of the United States Patent and Trademark Office*